(12) United States Patent
Kawatani et al.

(10) Patent No.: US 9,334,004 B2
(45) Date of Patent: May 10, 2016

(54) VEHICLE SEAT STRUCTURE

(75) Inventors: Shinji Kawatani, Saitama (JP);
Tsutomu Takeuchi, Saitama (JP);
Yukinori Kurakawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 655 days.

(21) Appl. No.: 13/299,373

(22) Filed: Nov. 18, 2011

(65) Prior Publication Data

US 2012/0126589 A1   May 24, 2012

(30) Foreign Application Priority Data

Nov. 22, 2010 (JP) .................. 2010-260519
Apr. 22, 2011 (JP) .................. 2011-096004

(51) Int. Cl.
*B62J 1/00* (2006.01)
*B62J 1/12* (2006.01)
*B62J 1/14* (2006.01)

(52) U.S. Cl.
CPC ..... *B62J 1/12* (2013.01); *B62J 1/14* (2013.01)

(58) Field of Classification Search
CPC .................. B62J 1/12; B62J 1/28; A47C 1/12
USPC .......... 297/195.12, 243, 215.11, 215.1, 452.6
See application file for complete search history.

(56) References Cited

U.S. PATENT DOCUMENTS

| | | | | |
|---|---|---|---|---|
| 4,413,700 A | * | 11/1983 | Shiratsuchi | .................... 180/219 |
| 4,609,226 A | * | 9/1986 | Yoshizawa | ................. 297/452.6 |
| 4,691,963 A | * | 9/1987 | Mikuniya et al. | ........ 297/195.12 |
| 4,702,522 A | * | 10/1987 | Vail et al. | .................. 297/452.56 |
| 4,804,221 A | * | 2/1989 | Saiki | .......................... 297/284.9 |
| 5,094,315 A | * | 3/1992 | Taki et al. | ...................... 180/219 |
| 5,533,783 A | * | 7/1996 | Harms et al. | ............. 297/195.13 |
| 6,070,896 A | * | 6/2000 | Saiki | ........................... 280/288.4 |
| 6,206,467 B1 | * | 3/2001 | Mense et al. | ................ 297/218.2 |
| 6,964,453 B1 | * | 11/2005 | Flegal et al. | ................ 297/452.6 |
| 7,503,627 B2 | * | 3/2009 | Kawasaki | .................. 297/452.56 |
| 7,837,260 B2 | * | 11/2010 | Hein et al. | ................ 297/195.12 |
| 2001/0022462 A1 | * | 9/2001 | Kawamoto et al. | ...... 297/440.22 |
| 2004/0130202 A1 | * | 7/2004 | Kawasaki | ................ 297/452.56 |
| 2005/0006944 A1 | * | 1/2005 | Ali et al. | ..................... 297/452.6 |
| 2005/0116517 A1 | * | 6/2005 | Fujihara et al. | ................ 297/243 |
| 2006/0284458 A1 | | 12/2006 | Lee | |

FOREIGN PATENT DOCUMENTS

CN   201457127 U   5/2010
JP   U 61-048892 A   4/1986

(Continued)

*Primary Examiner* — David E Allred
*Assistant Examiner* — Alexander Harrison
(74) *Attorney, Agent, or Firm* — Birch, Stewart, Kolasch & Birch, LLP (57) ABSTRACT

A vehicle seat structure allowing a reduction in the weight of a seat while ensuring cushioning performance. The seat includes a base plate member with an outer frame forming an outer periphery of the seat, and concave portions with seating positions and a seat back position on an inner peripheral side of the outer frame made concave in a direction of a seating load. In addition, the seat includes a fabric member that is provided in a tensioned state in such a manner so as to close open sides of the concave portions for supporting an occupant's weight. A first cushion member is provided in positions on the fabric member, at least corresponding to the outer frame.

21 Claims, 12 Drawing Sheets

(56) References Cited

FOREIGN PATENT DOCUMENTS

| JP | U 63-196789 A | 12/1988 |
| JP | 2002-211460 A | 7/2002 |
| JP | 2010-023703 A | 2/2010 |
| JP | 2010-070101 A | 4/2010 |

\* cited by examiner

VEHICLE SEAT STRUCTURE

CROSS-REFERENCE TO RELATED APPLICATIONS

The present application claims priority under 35 USC 119 to Japanese Patent Application No. 2010-260519 filed on Nov. 22, 2010 and Japanese Patent Application No. 2011-096004 filed on Apr. 22, 2011 the entire contents of which are hereby incorporated by reference.

BACKGROUND OF THE INVENTION

1. Field of the Invention

The present invention relates to a vehicle seat structure suitable for saddle-ride type vehicles such as motorcycles.

2. Description of Background Art

Saddle-ride seats for motorcycles are known. See, for example, see JP-A No. 2002-211460 wherein a cushion material such as a urethane sponge is set on a seat base plate and covered, from its upper side, with seat upholstery to form a seat.

However, in the above-described known structure, there has been a problem of being easy to increase the weight of the cushion material, and by extension, of the seat as a whole because cushioning performance is ensured only by the thickness of the cushion material.

SUMMARY AND OBJECTS OF THE INVENTION

Accordingly, an object of an embodiment of the present invention is to provide a vehicle seat structure to allow a reduction in the weight of a seat, while ensuring cushioning performance.

According to an embodiment of the present invention, a structure of a vehicle seat for an occupant to sit on includes a seat including a framework member that forms a main framework of the seat. The framework member has an outer frame forming an outer periphery of the seat with concave portions. Seating positions on an inner peripheral side of the outer frame are made concave in a direction of a seating load.

In addition, the seat includes a sheet-like tension member that is provided in a tensioned state on open sides of the concave portions in such a manner so as to close the concave portions for supporting occupant's weight. A cushion member that is provided in positions on the tension member, corresponding at least to the outer frame.

According to an embodiment of the present invention, the seat is a twin-seater having the front and rear seating positions for a rider and a pillion passenger in front and rear of the seat, respectively. The framework member has a cross portion extending horizontally between the front and rear seating positions.

According to an embodiment of the present invention, a waist pad for a rider is formed above the cross portion by the cushion member.

According to an embodiment of the present invention, the seat further includes a seat upholstery for covering the tension member and the cushion member.

According to an embodiment of the present invention, a second cushion member is disposed within the seat upholstery.

According to an embodiment of the present invention, the second cushion member is previously attached to a predetermined position of the seat upholstery.

According to an embodiment of the present invention, a third cushion member is disposed on corners each formed by a reverse side of the tension member and a surface of the framework member in contact with the tension member.

According to an embodiment of the present invention, the seat further includes a grip portion to be gripped by an occupant, and the grip portion is integrally formed with the outer frame.

According to an embodiment of the present invention, the grip portion extends from fixing portions provided on the outer frame and fixed to a body frame.

According to an embodiment of the present invention, the cushioning performance of the seating positions can be ensured by the tension and bend of the tension member. It is therefore possible to reduce the amount of the cushion member and the weight of the seat as a whole, relative to a known case where cushioning performance is ensured only by the thickness of the cushion member.

Also, the cushion member is provided on the tension member, at least over the outer frame. Thus, the cushion member can be set only in portions where the framework member prevents the tension member from bending sufficiently, thereby allowing a reduction in the weight of the seat and equalization of the cushioning performance.

According to an embodiment of the present invention, it is possible to support the front, rear, and intermediate portions of the tension member with the cross portion and stabilize the shape of a seat seating surface.

According to an embodiment of the present invention, it is possible to enhance the comfort of the front seating position for a rider.

According to an embodiment of the present invention, it is possible to ensure weather resistance of the seat, while retaining the characteristics of the tension member and the cushion member.

According to an embodiment of the present invention, it is possible to ensure, using the second cushion member, the softness and comfort to the touch of a seat seating surface, while keeping the tension of the tension member.

According to an embodiment of the present invention, it is possible to facilitate installation of the second cushion member.

According to an embodiment of the present invention, even if the tension member bends when an occupant is seated, the hardness of the framework member is hardly felt on the seat seating surface, thereby allowing further enhancement of the comfort of the seat.

According to an embodiment of the present invention, it is possible to achieve integration between the outer frame and the passenger grip requiring stiffness, so that reductions in the number of components and weight are reasonably achievable.

According to an embodiment of the present invention, a load applied to the passenger grip can be directly transmitted to the body frame, so that the load on the outer frame due to the application of load to the passenger grip is reduced. It is therefore possible to attain a reduction in the weight of the outer frame and suppress relative position variation of the passenger grip with respect to the body frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, embodiments of the present invention will be described with reference to the accompanying drawings. It should be noted that, in the following description, directions such as front, rear, left, and right are the same as those of a vehicle to be described below, unless otherwise mentioned. It should be also noted that, in the drawings used in the following description, there are suitably shown arrow FR indicating the front of the vehicle, arrow LH indicating the left of the vehicle, and arrow UP indicating the upper side of the vehicle.

Figure 1:
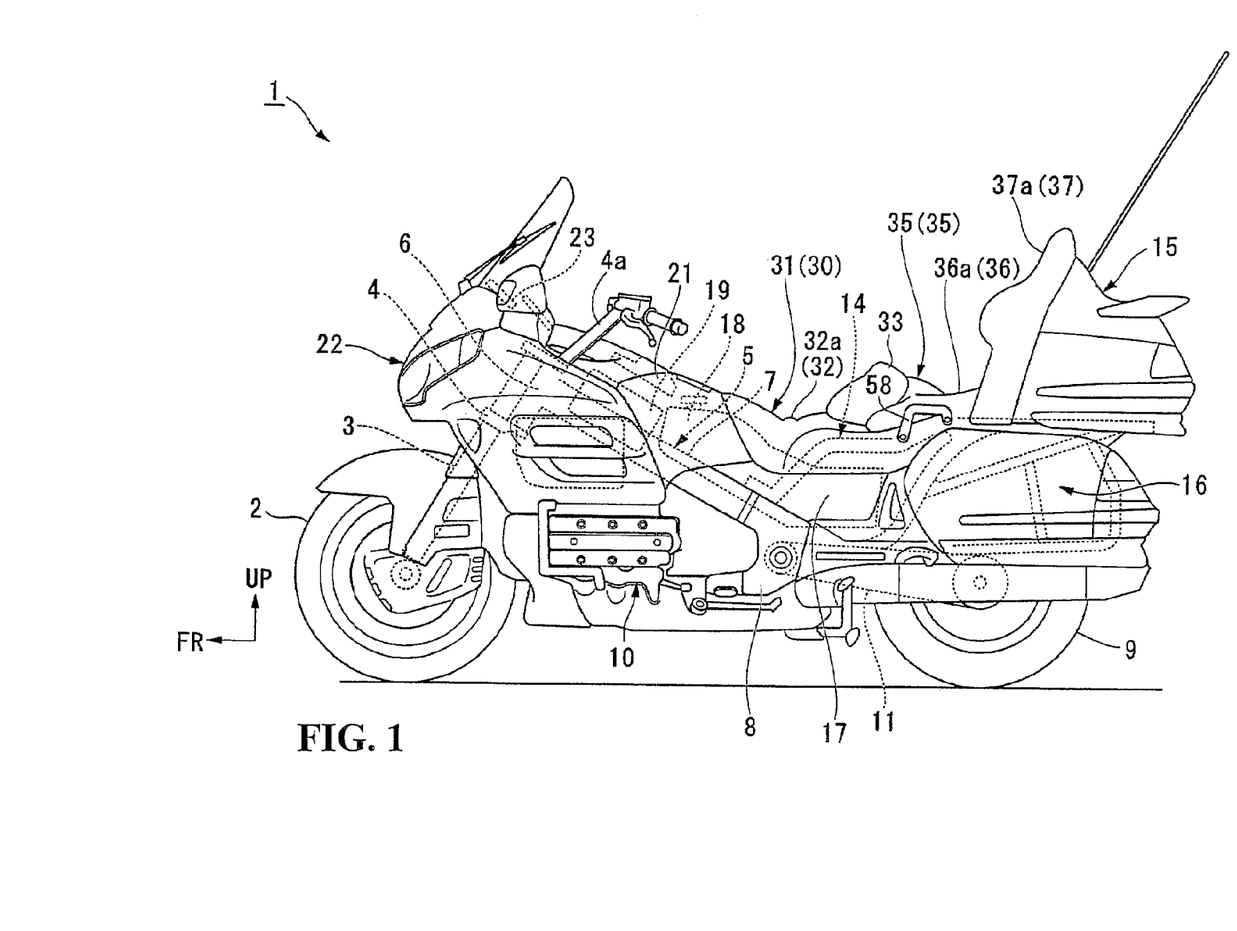
FIG. 1 is a left side view of a motorcycle according to an embodiment of the present invention.

In a motorcycle 1 shown in FIG. 1, a front wheel 2 of the motorcycle 1 is journaled to lower ends of a pair of left and right front forks 3. An upper portion of each front fork 3 is steerably pivotally supported through a steering stem 4 by a head pipe 6 at a front end of a body frame 5. A handlebar 4a for front wheel steering is attached to an upper portion of the steering stem 4.

A pair of left and right main frames 7 extends obliquely downward and rearward from the head pipe 6. Upper ends of a pair of left and right pivot frames 8 are continuous with respective rear ends of the main frames 7. A four-stroke, water-cooled, horizontally-opposed, six-cylinder engine 10, serving as a motor of the motorcycle 1, is supported below the main frames 7, in front of the pivot frames 8.

A front end of a swing arm 11 for journaling a rear wheel 9 is pivotally supported in a vertically swingable manner on the pivot frames 8. The swing arm 11 is of the cantilever type in which the rear wheel 9 is journaled to a rear end of a right-hand hollow arm. A drive shaft (not shown) extending from a transmission (not shown) in the rear of the engine 10 is inserted into the right aim. Power transmission between the engine 10 and the rear wheel 9 is performed through this drive shaft or the like.

A front end of a rear frame 14 for supporting a seat 30 for an occupant to sit on, and the like, is joined and fixed to each pivot frame 8.

Figure 2:
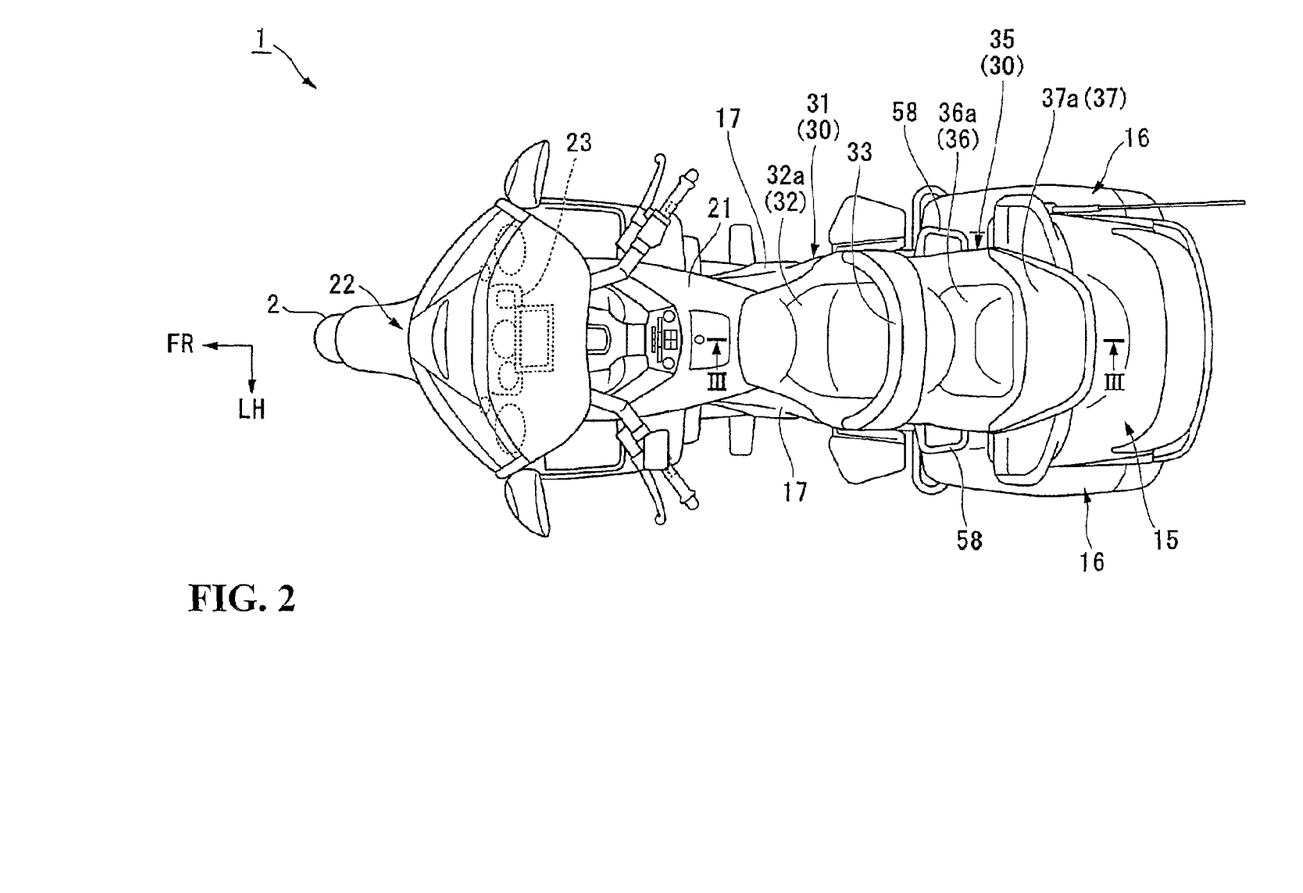
FIG. 2 is a top plan view of the motorcycle.

Referring also to FIG. 2, a rear trunk 15 is disposed in the rear of the seat 30. Left and right saddlebags 16 are disposed on either side below a rear portion of the seat 30. It is to be noted that reference sign 17 in the FIG. 2 denotes left and right side covers disposed on either side below a front portion of the seat 30.

A fuel tank 18, located below a front portion of the seat 30, is disposed between the left and right side covers 17. A front portion of the fuel tank 18 extends forward of the seat 30. An air cleaner box 19 for use in engine intake air filtration, or the like, is disposed in front of the fuel tank 18. A top shelter 21 is provided in front of the seat 30 to cover from above vehicle components such as the fuel tank 18 and the air cleaner box 19.

A vehicle body front portion of the motorcycle 1 is covered with a large front cowl 22. A meter panel 23 including a speedometer, a tachometer and the like is provided in the rear of an upper portion of the front cowl 22. The top shelter 21 is disposed in an obliquely lower rear direction of the meter panel 23 in such a manner as to be continuous with the meter panel 23.

The seat 30 integrally includes a front seat 31 for a rider and a rear seat 35 for a pillion passenger. The front seat 31 includes a front seat body 32 forming a front seating surface 32a for a rider, and a backrest 33 raised upward at a rear end of the front seat body 32. The rear seat 35 includes a rear seat body 36 forming a rear seating surface 36a for a pillion passenger, and a seat back 37 erected upward at a rear end of the rear seat body 36. The seat back 37 is supported by a front wall of the rear trunk 15. Hereinafter, a front surface of the seat back 37 is referred to as a seat back surface 37a.

Figure 3:
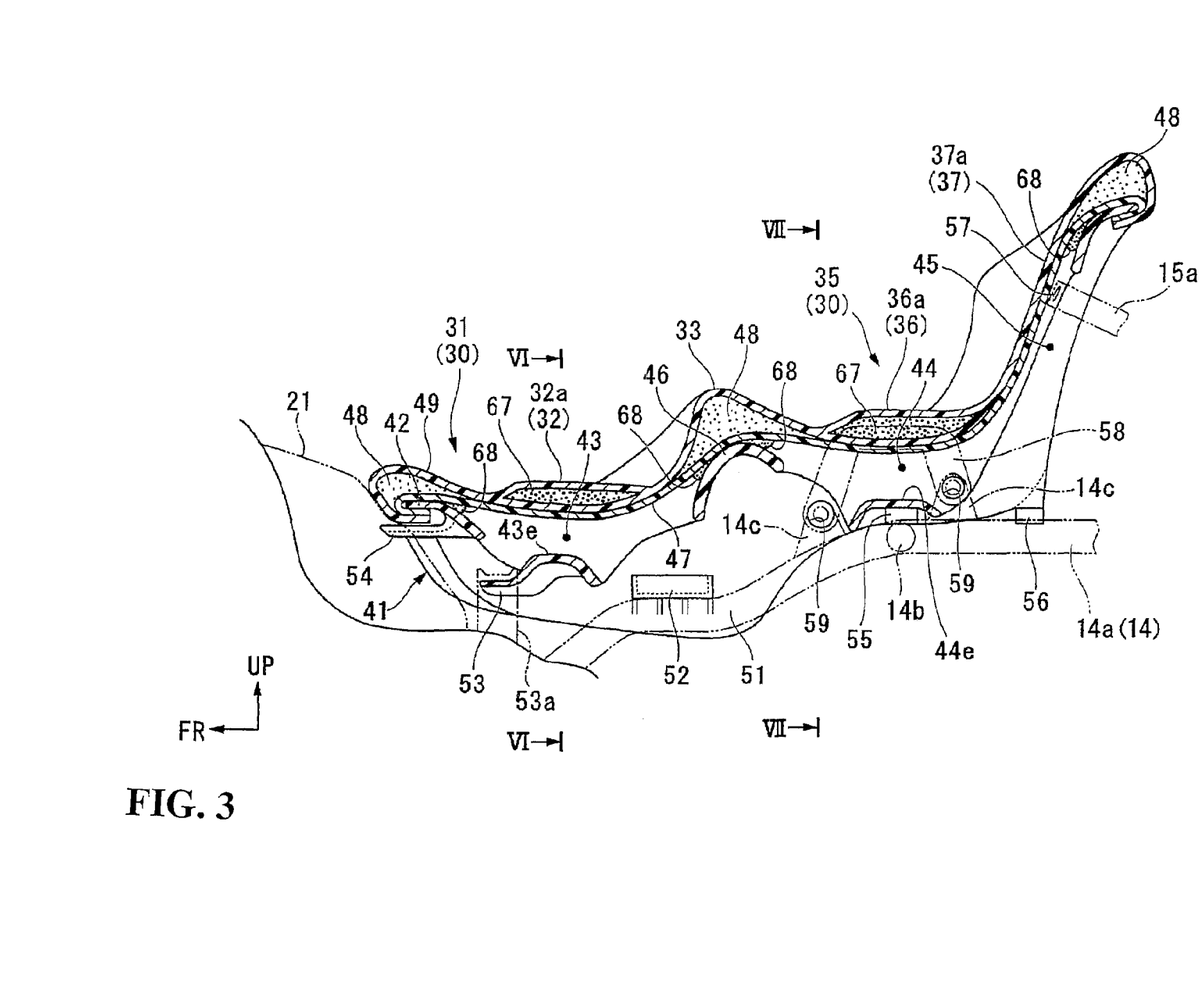
FIG. 3 is a sectional view taken along line of FIG. 2.
Figure 4:
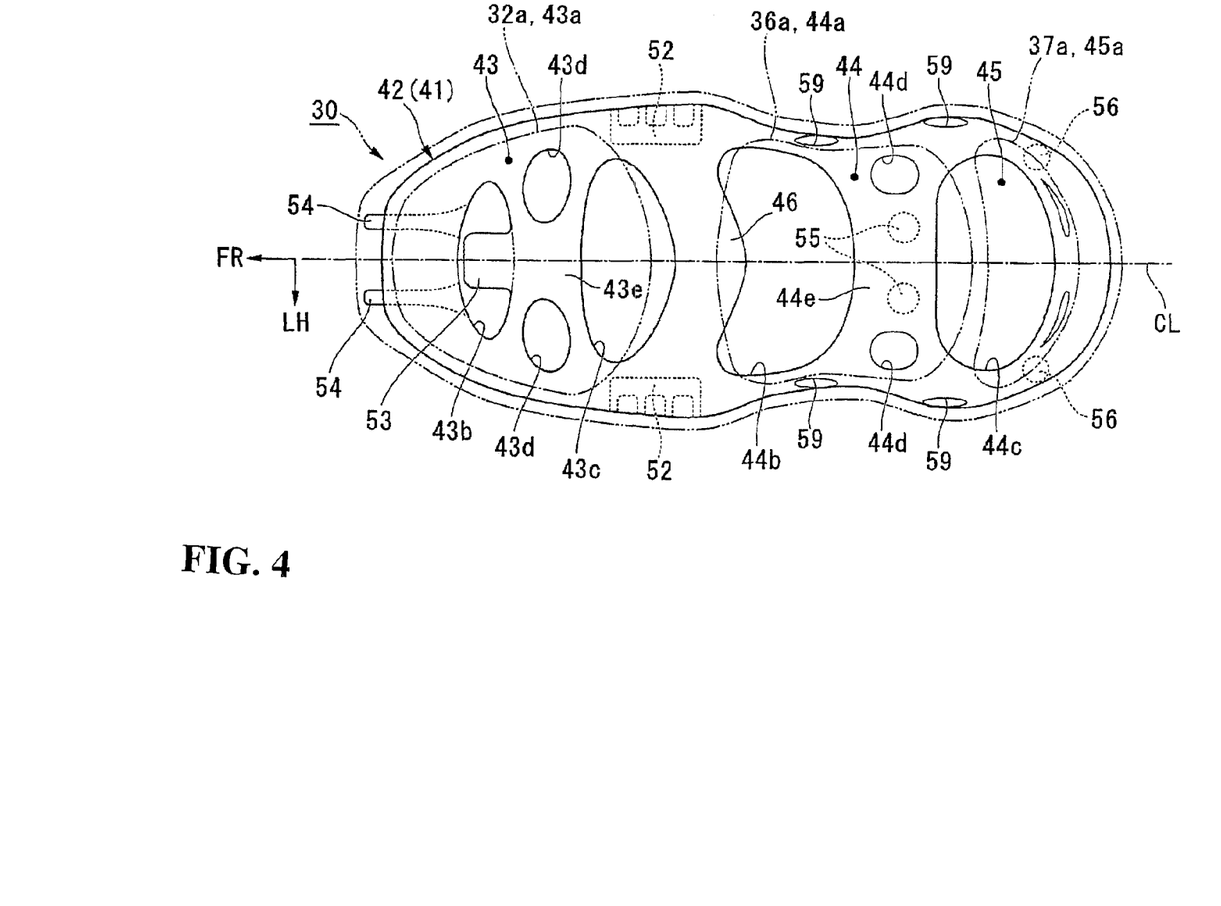
FIG. 4 is a top plan view of a base plate member of a seat of the motorcycle.
Figure 5:
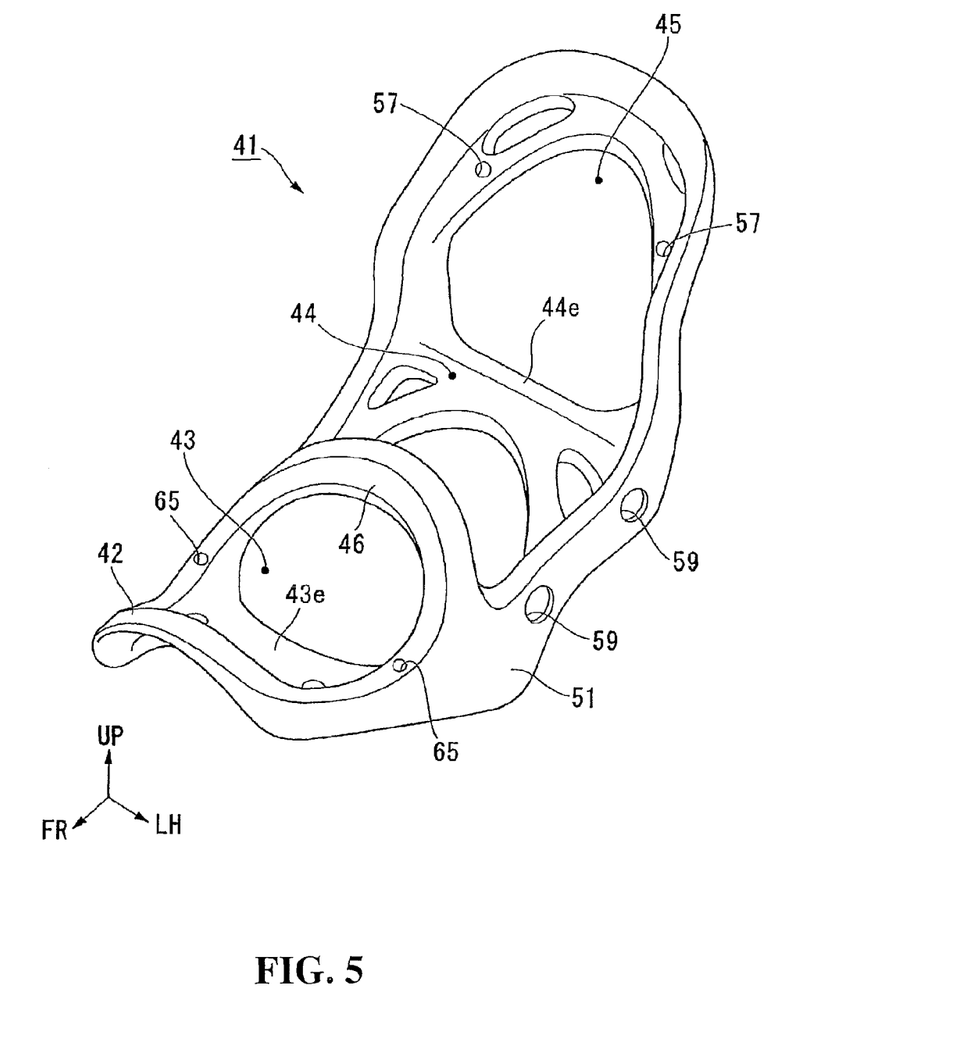
FIG. 5 is a perspective view of the base plate member.

As shown in FIGS. 3, 4, and 5, the seat 30 includes a frame-like base plate member 41 that forms a main framework of the front and rear seats 31 and 35 and the seat back 37. The base plate member 41 has an outer frame 42 forming an outer periphery of the seat 30; a front concave portion 43 with a front seating position 43a on the inner peripheral side of a front portion of the outer frame 42 made concave in a direction (downward) of a seating load; a rear concave portion 44 with a rear seating position 44a on the inner peripheral side of a rear portion of the outer frame 42 made concave in a direction (downward) of a seating load; a rear upper concave portion 45 with a seat back position 45a on the inner peripheral side of a rear upper portion of the outer frame 42 made concave in a load direction (rearward); and a cross portion 46 extending horizontally between the front and rear seating positions 43a and 44a. It is to be noted that reference sign CL in the figures indicates a horizontal center line of the seat 30 (and a vehicle body).

Also, the seat 30 includes: a fabric member 47 that is provided in a tensioned state with a predetermined tension on open sides of the concave portions 43, 44, and 45, in such a manner so as to cover (close) the open sides (the upper sides) of the front and rear concave portions 43 and 44 and the open side (the front side) of the rear upper concave portion 45; a first cushion member 48 that is provided on surfaces (upper and front surfaces) of the fabric member 47 in such a manner so as to avoid at least central portions (the inner peripheral sides) of the concave portions 43, 44, and 45 (the front and rear seating positions 43a and 44a and the seat back position 45a) (in other words, the first cushion member 48 is provided at least over the outer frame 42 and the cross portion 46); and seat upholstery 49 for covering, from above and the front, seat components such as the fabric member 47 and the first cushion member 48.

The fabric member 47 is supported only by its tension on the respective inner sides of the concave portions 43, 44, and 45. This fabric member 47 bends as appropriate when an occupant is seated, thereby supporting occupant's weight while exerting the cushioning performance of the front and rear seating positions 43a and 44a and the seat back position 45a. Portions of the fabric member 47 abutting on and directly supported by the base plate member 41 are prevented from bending. For this reason, the first cushion member 48 is disposed only on such portions, thereby minimizing the amount of the cushion member, and at the same time, evenly ensuring the cushioning performance of the front and rear seating positions 43a and 44a and the seat back position 45a.

The base plate member 41 is a single piece made of synthetic resin material such as polypropylene, and formed into an elliptical shape that is symmetric in a top plan view and longitudinally elongated (see FIG. 4). The outer periphery of the base plate member 41 corresponds to the outer frame 42 forming the outer periphery of the seat 30 including the seat back 37. The cross portion 46 extends between left and right sides of the outer frame 42.

A portion surrounded by the front portion of the outer frame 42 and the cross portion 46 corresponds to the front concave portion 43. A portion surrounded by the rear portion of the outer frame 42 and the cross portion 46 corresponds to the rear concave portion 44. A portion surrounded by the rear upper portion of the outer frame 42 corresponds to the rear upper concave portion 45. The rear concave portion 44 and the rear upper concave portion 45 are integrally provided.

Referring to FIG. 3, the front portion of the outer frame 42 and a front portion of the cross portion 46 are formed into a curved plate protruding to the inside and upwardly of the front concave portion 43. Also, the rear portion and rear upper portion of the outer frame 42 and a rear portion of the cross portion 46 are formed into a curved plate protruding to the inside and upwardly of the rear concave portion 44 and the rear upper concave portion 45.

Referring also to FIG. 5, the outer frame 42 forms left and right extension portions 51 extending downwardly on either side of the seat 30. Left and right base portions 52 for supporting particularly a load of the front seat 31 on front portions of left and right seat rails 14a of the rear frame 14 are formed on the respective inner sides of longitudinally intermediate portions of the left and right extension portions 51.

Referring also to FIG. 4, the front concave portion 43 forms front and rear openings 43b and 43c in front and in the rear, respectively, and left and right relatively-small openings 43d on either side. A front bridge portion 43e, which is left on a longitudinally intermediate portion of the front concave portion 43, has a trapezoidal cross-sectional shape protruding upwardly and extends horizontally.

A locking claw 53 projecting forward is integrally formed on a horizontally intermediate portion of the front bridge portion 43e. This locking claw 53 is inserted from behind into a gate-shaped seat locking plate 53a (see FIG. 3) standing erect upwardly from the body frame 5 to be brought into engagement therewith. Thus, a front portion of the seat 30 is held by the body frame 5.

A pair of left and light auxiliary locking claws 54 projecting forward are integrally formed on front ends of the outer frame 42. These auxiliary locking claws 54 are inserted from behind into rear ends of the top shelter 21 to be brought into engagement therewith. Thus, a seat front end is prevented from lifting from the top shelter 21.

The rear concave portion 44 forms, in the same manner as the front concave portion 43, front and rear openings 44b and 44c in front and in the rear, and left and right relatively-small openings 44d on either side. The rear opening 44c also forms the rear upper concave portion 45 on a rear upper side thereof. A rear bridge portion 44e, which is left on a longitudinally intermediate portion of the rear concave portion 44, has a trapezoidal cross-sectional shape protruding upwardly and extends horizontally.

Left and right front cushion rubbers 55 are disposed on a lower surface on either side of the rear bridge portion 44e, and abut on a cross pipe 14b extending between the left and right seat rails 14a. Also, left and right rear cushion rubbers 56 are disposed on rear lower ends of the outer frame 42, and abut on rear portions of the left and right seat rails 14a. Through these cushion rubbers 55 and 56, particularly a load of the rear seat 35 is supported by the rear frame 14.

On both sides of a rear upper portion of the outer frame 42, there is provided a supported portion 57 that is fixed, for example by being fastened to a seat supporting portion 15a extending from a front wall of the rear trunk 15.

Figure 7:
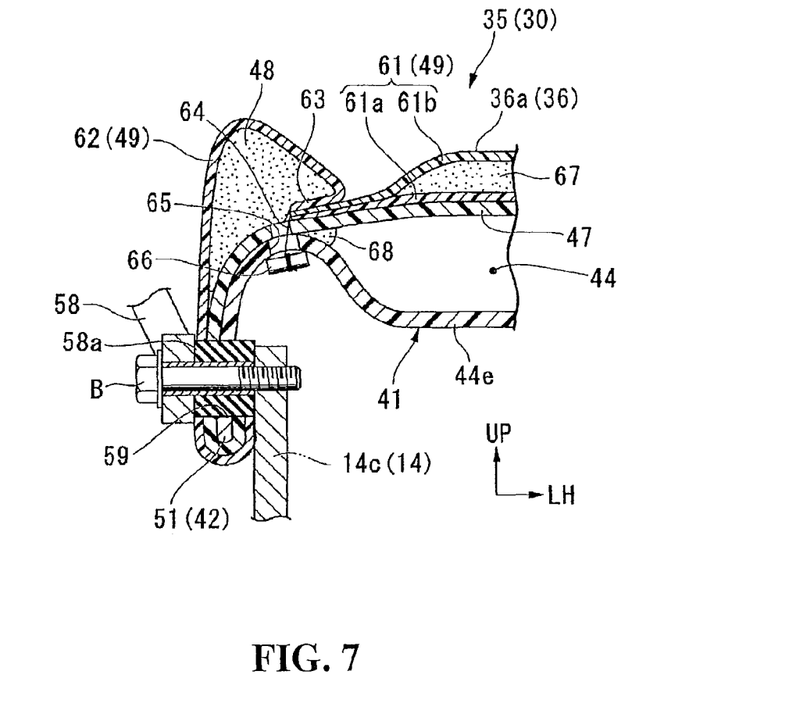
FIG. 7 is a sectional view taken along line VII-VII of FIG. 3.

In addition, referring also to FIG. 7, in each of the left and right extension portions 51 on the rear portion of the outer frame 42, there are formed a pair of front and rear through-holes 59 allowing insertion of bolts B, etc. for supporting each of left and right passenger grips 58.

Each through-hole 59 engages, through a rubber bushing 58a, with a shank of each of the bolts B for fastening base ends of the left and right passenger grips 58 to the rear frame 14. The seat 30 is integrally held by the vehicle body through the above-described claws 53 and 54, through-holes 59, and supported portions 57. It is to be noted that reference sign 14c in the FIG. 7 denotes a fastening portion provided on the seat rail 14a to fix the passenger grip 58 with the bolt B.

Figure 6A:
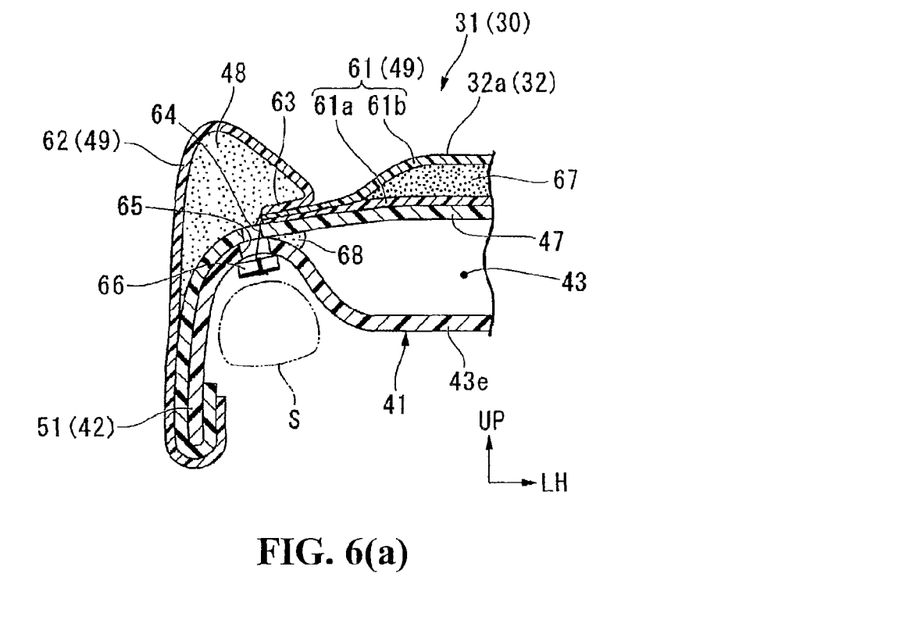
FIGS. 6(a) and 6(b) are sectional views taken along line VI-VI of FIG. 3, wherein 6(a) illustrates the seat before an occupant is seated, and 6(b) illustrates the seat when an occupant is seated.
Figure 6B:
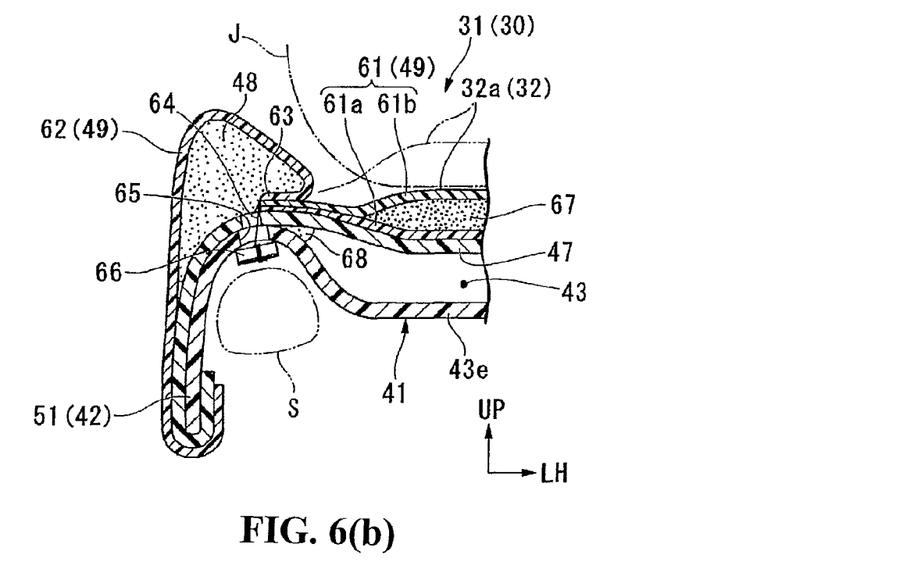

Referring to FIGS. 3, 6(a) and 6(b), the fabric member 47 is a mesh fabric and made from stretch fabric such as polyester fiber. The fabric member 47 is wrapped at its outer periphery around an outer periphery of the base plate member 41, in a state of abutting on and being supported by the outer frame 42 and the cross portion 46. In this state, the fabric member 47 is secured to the outer periphery of the base plate member 41 by metal clips or the like. The fabric member 47 is made of a breathable material such as a mesh material, thereby allowing enhancement of the comfort of the seating surface.

The bridge portions 43e and 44e of the front and rear concave portions 43 and 44 are each located below and at a distance from the fabric member 47 (see FIG. 6(a)) so as to allow the fabric member 47 to bend to the inner side (lower side) of the front and rear concave portions 43 and 44 when an occupant J is seated (see FIG. 6(b)). The fabric member 47 is provided in a tensioned state with sufficient tension to support occupant's weight. The fabric member 47 bends, thereby ensuring the cushioning performance of the front and rear seating positions 43a and 44a. Thus, a fatigue reduction can be achieved by the body pressure dispersion effect.

On the other hand, in the portions of the fabric member 47 abutting on and supported by the base plate member 41, the cushioning performance cannot be ensured by a bend of the fabric member 47. For this reason, the first cushion member 48 is disposed only on such portions of the fabric member 47. The first cushion member 48 is made of a foam material such as a urethane sponge and fixed on the fabric member 47 by adhesion or the like.

The first cushion member 48 is provided so as to substantially overlap the outer frame 42 and the cross portion 46 in a top plan view. However, the first cushion member 48 is provided over a slightly larger area than each portion of the fabric member 47 abutting on and supported by the base plate member 41 because a contact area of the fabric member 47 with the base plate member 41 increases when the fabric member 47 bends. Above the cross portion 46, the first cushion member 48 has a triangular section and projects upward, which forms the backrest 33 of the front seat 31.

The first cushion member 48 is not provided at least on central portions (the inner peripheral sides) of the front and rear seating positions 43a and 44a and the seat back position 45a. In the seat 30, therefore, the amount of the cushion member is drastically reduced, relative to a known structure in which a cushion member is disposed all over the front and rear seating positions 43a and 44a and the seat back position 45a so that cushioning performance is ensured by the thickness of the cushion member. Also, by reducing the cushion thickness, the seat height (seating surface height) can be reduced or an underseat space S can be set for storing manuals, tools, and security-related items (such as a GPS antenna) (see FIGS. 6(a) and 6(b)).

The seat upholstery 49 is made of a polyvinyl chloride sheet or the like and covers the base plate member 41, the fabric member 47, and the first cushion member 48 which form the outer shape of the seat 30, thereby ensuring the weather resistance of the seat 30. In the same manner as the fabric member 47, the seat upholstery 49 is wrapped at its outer periphery around an outer periphery of the base plate member 41, and in this state, secured to the outer periphery of the base plate member 41 by metal clips or the like.

Referring to FIGS. 6(a) and 6(b), the seat upholstery 49 is separately composed of a portion (hereinafter referred to as a first covering portion 61) for covering the fabric member 47 on the inner peripheral side of the front and rear seating surfaces 32a and 36a, and a portion (hereinafter referred to as a second covering portion 62) for covering the first cushion member 48 on the outer peripheral side of the front and rear seating surfaces 32a and 36a. The covering portions 61 and 62 are joined to each other with a predetermined overlap margin. An overlap portion 63 between the covering portions 61 and 62 is held in a state of being pulled in between the fabric member 47 and the first cushion member 48.

The holding structure with the overlap portion 63 pulled in between the fabric member 47 and the first cushion member 48 is composed of a pull string 64 for pulling the overlap portion 63, a through-hole 65 passing through the fabric member 47 and the base plate member 41 supporting the fabric member 47, and a locking member 66 for locking the pull string 64 on the underside of the base plate member 41. Thus, the overlap portion 63 is pulled in between the fabric member 47 and the first cushion member 48, so that the boundary of the covering portions 61 and 62 becomes clear and a quality appearance of the whole seat is created.

In the seat upholstery 49, at least the first covering portion 61 has a double structure. The first covering portion 61 includes, between inner and outer layers 61a and 61b thereof, a second cushion member 67 having elasticity softer than the fabric member 47 in a tensioned state. The second cushion member 67 is made of, for example, cotton material, and formed into a sheet along the front and rear seating surfaces 32a and 36a and the seat back surface 37a. This makes a seat surface more comfortable to the touch and softer, while enabling occupant's weight to be supported by tension of the fabric member 47.

Also, a third cushion member 68 is disposed on corners each formed by a reverse side of the fabric member 47 and a surface of the base plate member 41 supporting the fabric member 47 on sections of the outer frame 42 and the cross portion 46, in such a manner so as to be sandwiched between the fabric member 47 and the base plate member 41. The third cushion member 68 is made of a foam material such as a urethane sponge. Thus, even if the fabric member 47 bends when an occupant is seated, the hardness of the base plate member 41 is hardly felt on the seat surface, and a bending base point of the fabric member 47 is flexible.

At the time of manufacturing the seat 30, firstly, the fabric member 47 is provided in a tensioned state and fixed on the base plate member 41, and then the first cushion member 48 is fixed in place by adhesion or the like to form an intermediate assembly. The third cushion member 68 is previously attached to the fabric member 47 or the base plate member 41, or is inserted into a predetermined portion after forming the above-described intermediate assembly. Thereafter, the seat upholstery 49 with the second cushion member 67, the pull string 64, etc. that are preinstalled, is put over the intermediate assembly, and locked by the locking member 66 with the pull string 64 pulled out to the underside of the base plate member 41 through the through hole. At the same time, an outer periphery of the seat upholstery 49 is fixed to an outer periphery of the base plate member 41 with tackers or the like. With that, assembly of the seat 30 is completed.

As described above, in the vehicle seat structure according to the above-described embodiment, the structure of the seat 30 for the motorcycle (saddle-ride type vehicle) 1 includes the base plate member 41 that forms a main framework of the seat 30. The base plate member 41 has the outer frame 42 forming an outer periphery of the seat 30, and the concave portions 43, 44, and 45 with the seating positions 43a and 44a and the seat back position 45a on an inner peripheral side of the outer frame 42 made concave in a direction of a seating load. Also, the structure of the seat 30 includes: the fabric member 47 that is provided in a tensioned state in such a manner as to close open sides of the concave portions 43, 44, and 45 for supporting occupant's weight; and the first cushion member 48 that is provided on the fabric member 47 in such a manner so as to avoid at least central portions of the front and rear seating positions 43a and 44a and the seat back position 45a.

With this structure, the cushioning performance of the seating positions 43a and 44a can be ensured by the tension and bend of the fabric member 47. It is therefore possible to reduce the amount of the cushion member and the weight of the seat as a whole, relative to a known case where cushioning performance is ensured only by the thickness of the cushion member.

Also, the first cushion member 48 is provided on the fabric member 47 in such a manner so as to avoid at least central portions of the front and rear seating positions 43a and 44a and the seat back position 45a. Thus, the cushion member can be set only in portions where the base plate member 41 prevents the fabric member 47 from bending sufficiently, thereby allowing a reduction in the weight of the seat 30 and equalization of the cushioning performance.

Furthermore, in the above-described vehicle seat structure, the seat 30 is a twin-seater having the front and rear seating positions 43a and 44a for a rider and a pillion passenger in front and rear of the seat 30, respectively. Also, the base plate member 41 has the cross portion 46 extending horizontally between the front and rear seating positions 43a and 44a.

With this structure, it is possible to support the front, rear, and intermediate portions of the fabric member 47 with the cross portion 46 and stabilize the shape of a seat seating surface.

Also, in the above-described vehicle seat structure, the backrest 33 for a rider is formed above the cross portion 46 by the first cushion member 48.

This structure allows enhancement of the comfort of the front seating position 43a for a rider.

Moreover, in the above-described vehicle seat structure, the seat upholstery 49 is provided for covering the fabric member 47 and the first cushion member 48.

With this structure, it is possible to ensure weather resistance of the seat 30, while retaining the characteristics of the fabric member 47 and the first cushion member 48.

Additionally, in the above-described vehicle seat structure, the second cushion member 67 is disposed within the seat upholstery 49.

With this structure, it is possible to ensure, using the second cushion member 67, the softness and comfort to the touch of a seat seating surface, while keeping the tension of the fabric member 47.

Also, in the above-described vehicle seat structure, the second cushion member 67 is previously attached to a predetermined position of the seat upholstery 49.

This structure allows easy installation of the second cushion member 67.

In addition, in the above-described vehicle seat structure, the third cushion member 68 is disposed on corners each formed by a reverse side of the fabric member 47 and a surface of the base plate member 41 in contact with the fabric member 47.

With this structure, even if the fabric member 47 bends when an occupant is seated, the hardness of the base plate member 41 is hardly felt on the seat seating surface, thereby allowing further enhancement of the comfort of the seat 30.

Next, a second embodiment of the present invention will be described with reference to FIGS. 9 to 12, citing FIGS. 1 and 2. This embodiment differs from the above-described first embodiment, particularly in that there are provided left and right passenger grips 158 or grip portions 158' integrally formed on the base plate member 41. As for the rest, the same elements as those in the foregoing embodiment are denoted by the same reference signs without adding detailed explanations. It should be noted that, for convenience of illustration, FIGS. 11 and 12 each show a section on the right of a seat.

Figure 9:
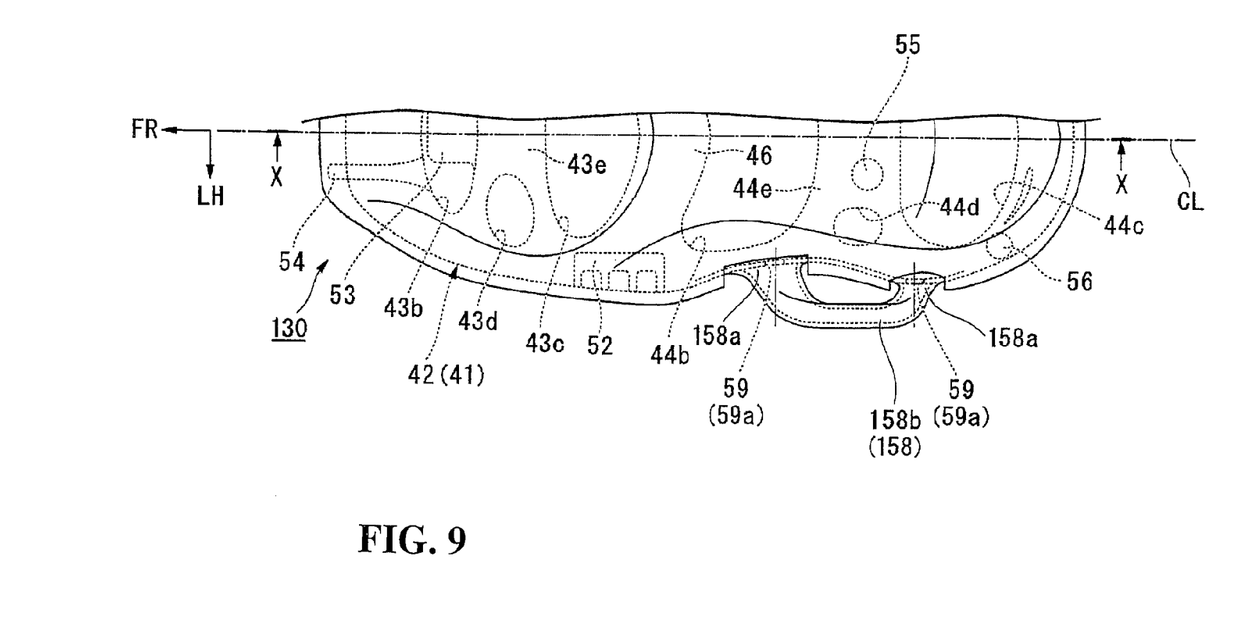
FIG. 9 is a top plan view of a seat according to a second embodiment of the present invention.
Figure 10:
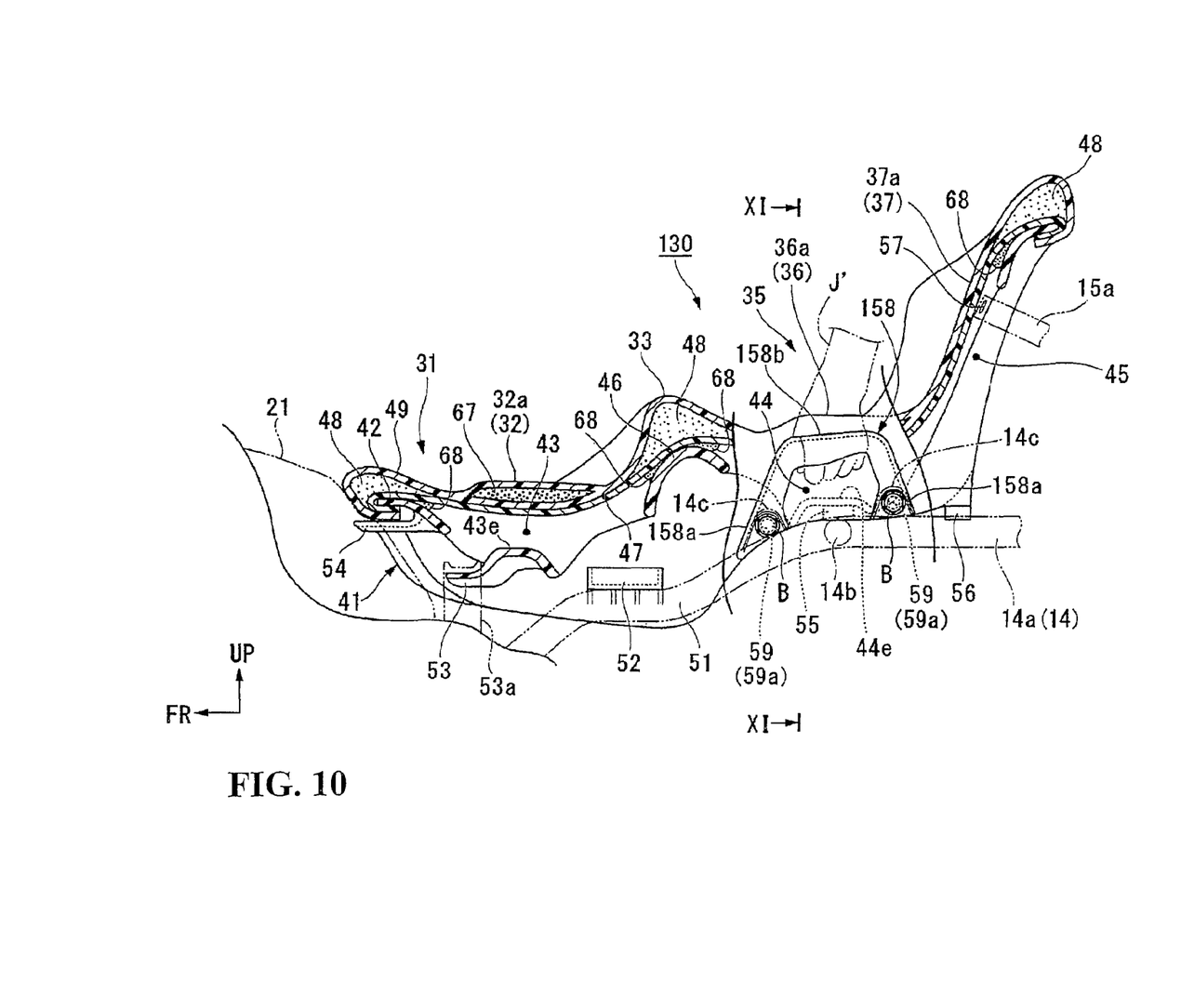
FIG. 10 is a sectional view taken along line X-X of FIG. 9.
Figure 11:
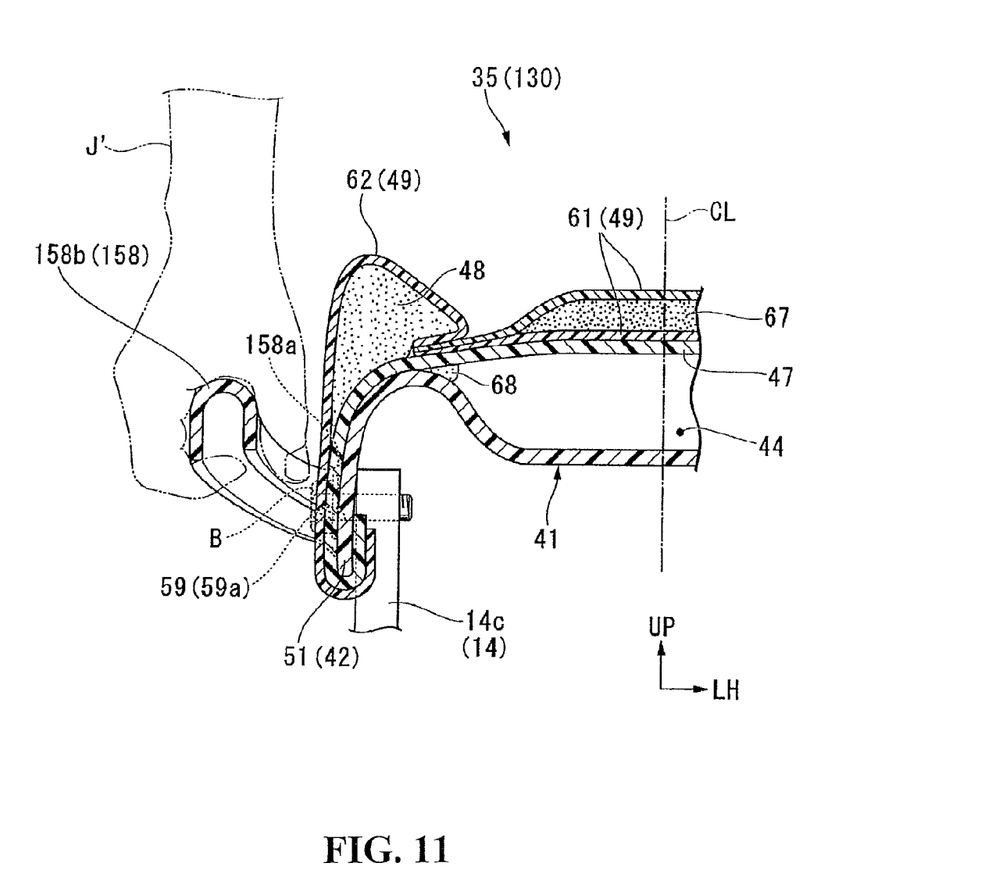
FIG. 11 is a sectional view taken along line XI-XI of FIG. 10.

In a seat 130 shown in FIGS. 9 to 11, the left and right passenger grips 158, which are the same as the left and right passenger grips 58 described above, are respectively integrally formed on the left and right extension portions 51 of the outer frame 42 of the base plate member 41.

Each of the left and right passenger grips 158 has a trapezoidal shape opened downwardly in a side view. Front and rear lower ends (hereinafter referred to as base ends 158a) of the passenger grip 158 are integrally connected to each of the left and right extension portions 51. The passenger grip 158 extends laterally from the base ends 158a and then bends upwardly. A leading end 158b of the passenger grip 158 is disposed at a distance laterally from a seat side surface. The leading end 158b serves as a grip portion to be gripped by a rear passenger. The passenger grip 158 is exposed to the outside by cutting out the fabric member 47 and the seat upholstery 49 around the base ends 158a.

The base ends 158a of the left and right passenger grips 158 are laterally integrally formed on seat fixing portions 59a provided on the left and right extension portions 51 and forming the through-holes 59. The bolt B, inserted from the side into each seat fixing portion 59a, is screwed and fastened to the corresponding fastening portion 14c provided on the rear frame 14. Thus, the respective base ends 158a of the left and right passenger grips 158 are fastened to the rear frame 14, along with the left and right extension portions 51 of the seat 130.

Figure 12:
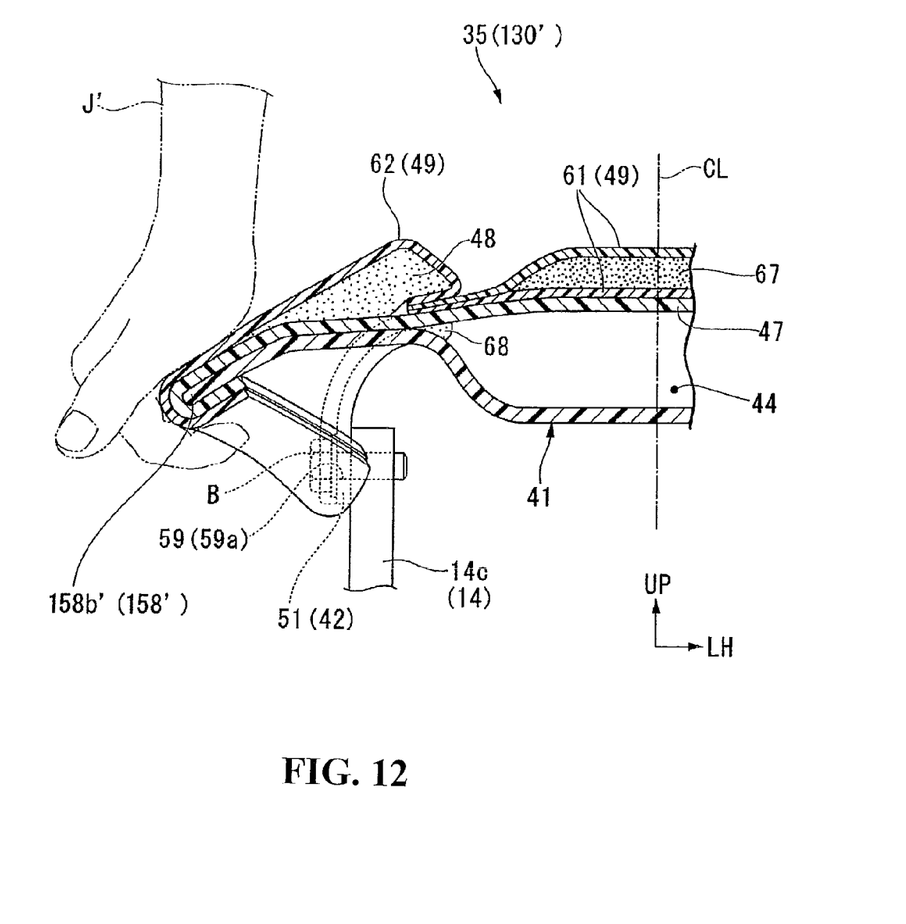
FIG. 12 is a sectional view corresponding to FIG. 11, illustrating a modification according to the second embodiment.

In a seat 130' shown in FIG. 12, the left and right grip portions 158', which are added to the above-described seat 130 in place of the left and right passenger grips 158, are respectively provided on the left and right extension portions 51 of the outer frame 42 of the base plate member 41.

The left and right grip portions 158' are formed by changing the left and right extension portions 51 each extending downwardly between the front and rear through-holes 59, into laterally and substantially horizontally extending shapes. A leading end 158b' of each of the left and right grip portions 158' is bent obliquely downwardly and laterally. The leading end 158b' serves as an occupant's grip portion. The leading end 158b' is continuous with a lower edge of each of the left and right extension portions 51, and the left and right grip portions 158' are each covered with the fabric member 47 and the seat upholstery 49. However, the left and right grip portions 158' may be exposed to the outside by cutting out the fabric member 47 and the seat upholstery 49 in the same manner as the left and right passenger grips 158.

In this manner, the passenger grips 158 (or the grip portions 158') to be gripped by an occupant and the outer frame 42 are integrated with each other, thereby allowing integration between the outer frame 42 and the passenger grips 158 (or the grip portions 158') requiring stiffness, so that reductions in the number of components and in the weight are reasonably achievable.

Also, the passenger grips 158 (or the grip portions 158') extend from the fixing portions (the seat fixing portion 59a) provided on the outer frame 42 and fixed to the body frame 5. Thus, loads applied to the passenger grips 158 (or the grip portions 158') can be directly transmitted to the body frame 5, and the load on the outer frame 42 due to the application of loads to the passenger grips 158 (or the grip portions 158') can be reduced. It is therefore possible to attain a reduction in the weight of the outer frame 42 and suppress relative position variation of the passenger grips 158 (or the grip portions 158') with respect to the body frame 5.

Figure 8:
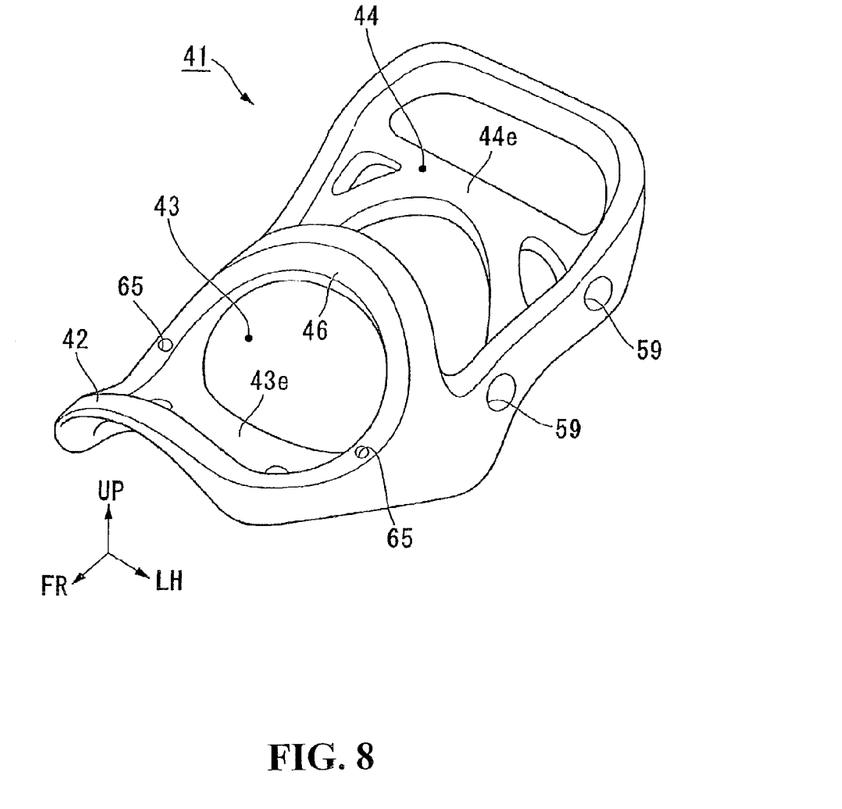
FIG. 8 is a perspective view corresponding to FIG. 5, illustrating a modification of the base plate member.

It should be understood that the present invention is not limited to the above-described embodiments, but also is applicable, for example to a seat not including (separate from) the seat back 37 (a base plate member in this case is denoted by reference sign 41' in FIG. 8).

Alternatively, a sheet or net of a synthetic resin material such as rubber or plastic may be used as a tension member for supporting occupant's weight in place of the fabric member 47. In other words, any tension member having sufficient strength to support occupant's weight may be employed.

Furthermore, the above-described vehicle seat structure is not limited to motorcycles in which an occupant sits astride a vehicle body, but also is applicable to motor-assisted bicycles, scooter-type vehicles, three-wheeled vehicles (including three-wheeled vehicles having two wheels in front and one in the rear, in addition to three-wheeled vehicles having one wheel in front and two in the rear), or four-wheeled vehicles. In particular, this vehicle seat structure is suitable for saddle-ride type vehicles with a seat exposed to the outside of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle seat structure, the structure of a vehicle seat for an occupant to sit on the seat comprising:
   a framework member forming a main framework of the seat, the framework member having an outer frame forming an outer periphery of the seat, and concave portions with seating positions on an inner peripheral side of the outer frame made concave in a direction of a seating load;
   a sheet tension member in direct contact with the outer frame and provided in a tensioned state on open sides of the concave portions for closing the concave portions for supporting an occupant's weight; and
   a cushion member provided in positions on the tension member, at least corresponding to the outer frame, wherein the cushion member is spaced apart from the outer frame by the tension member further comprising locking claws attached to said framework member and said sheet tension member,
   wherein the framework member is a single piece made of a synthetic resin material, and said locking claws comprising a pair of left and right auxiliary locking claws projecting forward are integrally formed on front ends of the framework member configured to engage a frame of a vehicle.

2. The vehicle seat structure according to claim 1,
   wherein the seat is a twin-seater having the front seating position for a rider and a rear seating position for a pillion passenger, respectively; and
   the framework member has a cross portion extending horizontally between the front and rear seating positions.

3. The vehicle seat structure according to claim 2, wherein the cushion member above the cross portion forms a waist pad for a rider.

4. The vehicle seat structure according to claim 1, wherein the seat further comprises a seat upholstery for covering the tension member and the cushion member.

5. The vehicle seat structure according to claim 2, wherein the seat further comprises a seat upholstery for covering the tension member and the cushion member.

6. The vehicle seat structure according to claim 3, wherein the seat further comprises a seat upholstery for covering the tension member and the cushion member.

7. The vehicle seat structure according to claim 4, wherein a second cushion member is disposed within the seat upholstery.

8. The vehicle seat structure according to claim 1, wherein a third cushion member is disposed on corners each formed by a reverse side of the tension member and a surface of the framework member in contact with the tension member.

9. The vehicle seat structure according to claim 2, wherein a third cushion member is disposed on corners each formed by a reverse side of the tension member and a surface of the framework member in contact with the tension member.

10. The vehicle seat structure according to claim 3, wherein a third cushion member is disposed on corners each formed by a reverse side of the tension member and a surface of the framework member in contact with the tension member.

11. The vehicle seat structure according to claim 4, wherein a third cushion member is disposed on corners each formed by a reverse side of the tension member and a surface of the framework member in contact with the tension member.

12. The vehicle seat structure according to claim 1, wherein the seat further comprises a grip portion to be gripped by an occupant, the grip portion being integrally formed with the outer frame.

13. The vehicle seat structure according to claim 2, wherein the seat further comprises a grip portion to be gripped by an occupant, the grip portion being integrally formed with the outer frame.

14. The vehicle seat structure according to claim 3, wherein the seat further comprises a grip portion to be gripped by an occupant, the grip portion being integrally formed with the outer frame.

15. The vehicle seat structure according to claim 12, wherein the grip portion extends from fixing portions provided on the outer frame and fixed to a body frame.

16. A vehicle seat structure comprising:
    a framework member having an outer frame forming an outer periphery of the seat, and concave portions with seating positions on an inner peripheral side of the outer frame made concave in a direction of a seating load;
    a sheet tension member in direct contact with the outer frame and provided in a tensioned state on open sides of the concave portions for closing the concave portions; and
    a cushion member provided in positions on the tension member, at least corresponding to the outer frame, wherein the cushion member is spaced apart from the outer frame by the tension member further comprising locking claws attached to said framework member and said sheet tension member,
    wherein the framework member is a single piece made of a synthetic resin material, and said locking claws comprising a pair of left and right auxiliary locking claws projecting forward are integrally formed on front ends of the framework member configured to engage a frame of a vehicle.

17. The vehicle seat structure according to claim 16,
    wherein the seat is a twin-seater having the front seating position and a rear seating position, respectively; and
    the framework member has a cross portion extending horizontally between the front and rear seating positions.

18. The vehicle seat structure according to claim 17, wherein the cushion member above the cross portion forms a waist pad for a rider.

19. The vehicle seat structure according to claim 16, wherein the seat further comprises a seat upholstery for covering the tension member and the cushion member.

20. The vehicle seat structure according to claim 1, wherein the pair of left and right auxiliary locking claws on the front ends of the framework member projects forward in a direction away from the outer periphery of the seat and the concave portions.

21. The vehicle seat structure according to claim 16, wherein the pair of left and right auxiliary locking claws on the front ends of the framework member projects forward in a direction away from the outer periphery of the seat and the concave portions.

* * * * *